United States Patent
Adachi et al.

[11] Patent Number: 4,662,484
[45] Date of Patent: May 5, 1987

[54] PIN BOOT PROTECTOR IN DISC BRAKE ASSEMBLY

[75] Inventors: Yoshiharu Adachi, Gamagoori; Fumio Fujimori, Anjo; Toshio Kondo; Hiroshi Uemura, both of Okazaki; Juichi Shibatani, Toyota, all of Japan

[73] Assignees: Aisin Seiki Kabushiki Kaisha, Kariya; Toyota Jidosha Kabushiki Kaisha, Toyota, both of Japan

[21] Appl. No.: 732,569

[22] Filed: May 10, 1985

[30] Foreign Application Priority Data

May 10, 1984 [JP] Japan .............................. 59-68517[U]

[51] Int. Cl.⁴ ............................................. F16D 65/14
[52] U.S. Cl. ........................... 188/73.45; 277/DIG. 4; 277/237 A; 188/72.4
[58] Field of Search ............... 188/73.45, 73.44, 73.39, 188/370, 72.4, 72.5, 73.31, 264 G, 205 R; 74/18.2; 277/212 FB, DIG. 4, 237 A

[56] References Cited

U.S. PATENT DOCUMENTS 4,448,288  5/1984  Delaunay ........................ 188/73.45
4,458,790  7/1984  Hoffman, Jr. et al. ...... 188/73.44 X
4,512,446  4/1985  Chuwman et al. .......... 188/73.45 X

FOREIGN PATENT DOCUMENTS 52543     5/1982  European Pat. Off. .
3029472   3/1982  Fed. Rep. of Germany ... 188/73.45
56-2431   1/1981  Japan .
58-79142  5/1983  Japan .
2026626   2/1980  United Kingdom .

Primary Examiner—Douglas C. Butler
Attorney, Agent, or Firm—Oblon, Fisher, Spivak, McClelland & Maier

[57] ABSTRACT

In a disc brake assembly of the pin slide type including a stationary support member mounted on a vehicle body structure and having at least one support pin secured thereto, a caliper member having a boss portion slidably supported on the support pin to be movable in an axial direction, and a tubular elastic boot arranged in surrounding relationship with the support pin to enclose a sliding portion on the same, a cylindrical protector with a closed end is arranged in surrounding relationship with the tubular elastic boot and fixed in place by engagement with the outer end portion of the support pin or a member secured thereto in such a way to contain therein the tubular elastic boot, the outer end portion of the support pin and its associated members.

8 Claims, 4 Drawing Figures

PIN BOOT PROTECTOR IN DISC BRAKE ASSEMBLY

BACKGROUND OF THE INVENTION

1. Field of the Invention

The present invention relates to a disc brake assembly for wheeled vehicles, and more particularly to a pin boot protector in a disc brake assembly of the pin slide type which includes a stationary support member mounted on a vehicle body structure and having at least one support pin fixed thereto, a caliper member slidably supported on the support pin to be movable in an axial direction of the brake assembly, and a tubular elastic boot arranged in surrounding relationship with the support pin, the caliper member straddling a portion of a rotary brake disc secured for rotation with a road wheel of the vehicle and having a fluid actuator on one side thereof to press the friction pad of an inner brake shoe against one face of the brake disc and a reaction portion on the opposite side thereof to press the friction pad of an outer brake shoe against the other face of the brake disc by reaction force caused by actuation of the fluid actuator.

2. Discussion of the Background

In Japanese Utility Model Early Publication No. 58-79142, there has been proposed a conventional disc brake assembly of the pin slide type as described above, wherein a cup-shaped rigid protector is arranged to enclose the tubular elastic pin boot for protection of the same. The proposed rigid protector is, however, fixed in place together with the support pin by means of a fastening bolt threaded into the stationary support member. This makes assembly and disassembly of the pin boot protector troublesome in replacement operation. Furthermore, the material for the protector is limited to a hard material to avoid loosening of the protector, resulting in an increase in manufacturing cost.

SUMMARY OF THE INVENTION

It is, therefore, a primary object of the present invention to provide an improved pin boot protector which can be assembled and disassembled in a simple manner and manufactured at a low cost.

According to the present invention, the object is attained by providing a disc brake assembly of the pin slide type wherein a cylindrical protector with a closed end is fixed in place by engagement with the outer end portion of the support pin or a member fixed thereto or engagement with the supported boss portion of the caliper member in such a way as to contain therein the tubular elastic pin boot and the outer end of the support pin. The cylindrical protector can be made of elastic or hard synthetic resin at a low cost, and is reliably assembled in place without any difficulty after the support pin has been fixed to the stationary support member by means of a fastening bolt to assemble the caliper member and its associated parts in place. Additionally, the pin boot protector is effective to prevent corrosion of the fastening bolt and its associated members.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

Figure 1:
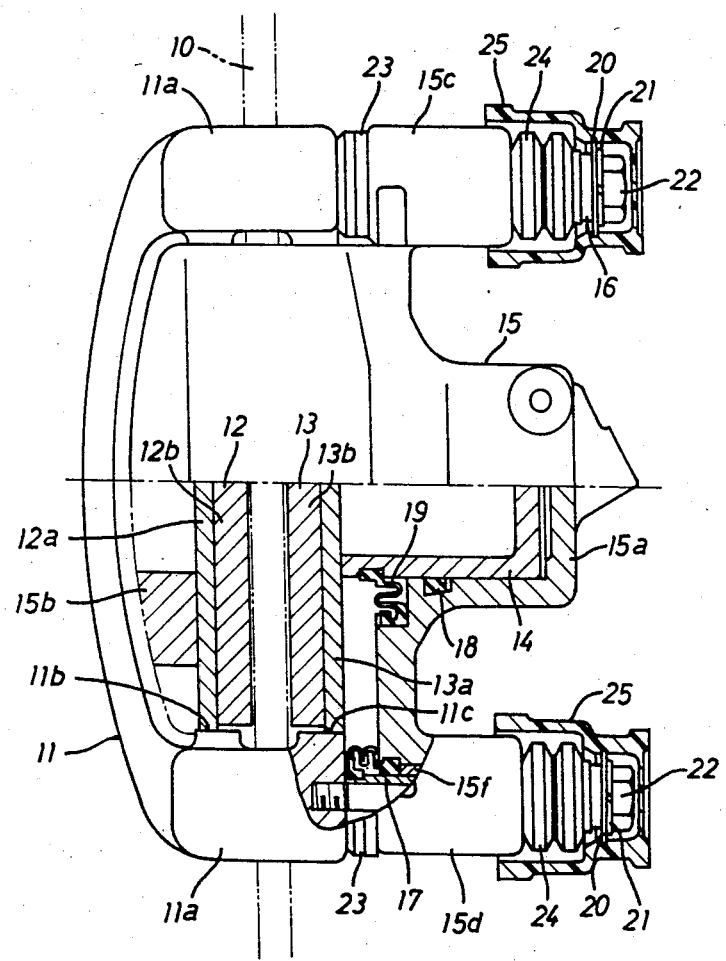
FIG. 1 is an elevation view partly in section of a disc brake assembly of the pin slide type in accordance with the present invention.
Figure 2:
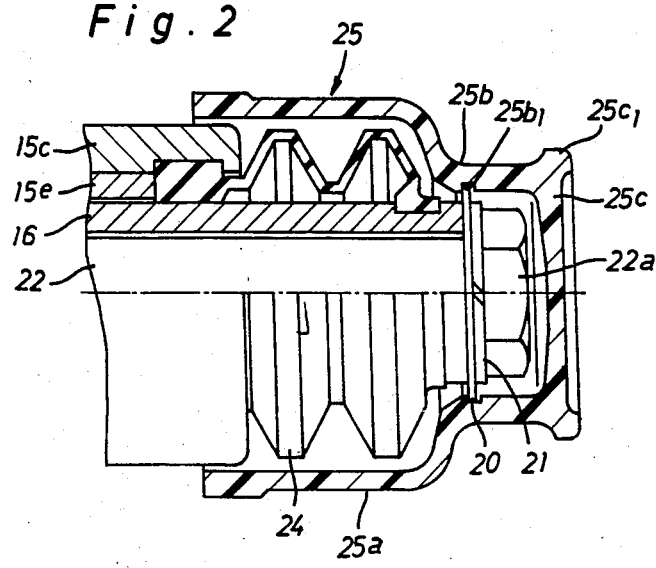
FIG. 2 is a partly enlarged sectional view of a pin boot protector in the disc brake assembly shown in Fig. 1.

In FIGS. 1 and 2 of the appended drawings, there is illustrated a disc brake assembly of the pin slide type in accordance with the present invention which includes a rotary brake disc 10 secured for rotation with a road wheel of an automotive vehicle, a stationary support member 11 fixedly mounted on a body structure of the vehicle such as a knucle member (not shown) at the inside of brake disc 10, outer and inner brake shoes 12 and 13 carried on the stationary support member 11 at the opposite sides of brake disc 10, a caliper member 15 straddling a portion of brake disc 10, and a pair of support pins 16 and 17 in parallel fixed to the stationary support member 11 to support thereon the caliper member 15.

The stationary support member 11 has a pair of arms 11a, 11a straddling the brake disc 10 and is formed with a pair of recessed portions 11b and 11c wherein backing plates 12a and 13a of the brake shoes 12, 13 are respectively assembled to be axially movable. The brake shoes 12, 13 are respectively provided with outer and inner friction pads 12b and 13b secured to the backing plates 12b and 13b. The caliper member 15 has a C-shaped cross-section for straddling the brake disc 10 and both the brake shoes 12, 13 and has a cylinder body 15a and a reaction portion 15b. The caliper member 15 is integrally formed at opposite ends thereof with a pair of arm bosses 15c and 15d which are slidably supported on the support pins 16 and 17 to be movable in the axial direction of brake disc 10. Within a cylindrical bore formed in the cylinder body 15a, a cup-shaped piston 14 is axially slidably disposed through an annular sealing member 18 to press the inner brake shoe 13 directly against one face of the brake disc 10. The annular sealing member 18 has a well-known function of retracting the piston 14 in response to release of pressurized fluid applied thereto. An annular elastic boot 19 is disposed to enclose the sliding portion between piston 14 and cylinder body 15a.

The support pins 16 and 17 each are in the form of a hollow pin which is fixed to the stationary support member 11 by means of a fastening bolt 22 threaded into the support member 11 through a flat washer 20 and a spring washer 21. Both the caliper arm bosses 15c and 15d are integrally provided therein with sleeve like bearing metals 15e and 15f, respectively. Both the support pins 16 and 17 are respectively provided thereon with bellows like elastic pin boots 23 and 24 which are arranged to protect the sliding portions between support pins 16, 17 and caliper arm bosses 15c, 15d. The elastic pin boots 23 and 24 each are fixedly engaged at their one ends with annular grooves formed on the respective support pins 16, 17 and at their other ends with annular grooves formed in the respective caliper arm bosses 15c, 15d.

Figure 3:
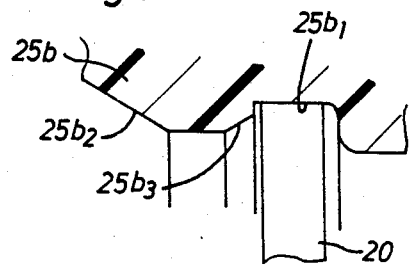
FIG. 3 is an enlarged sectional view for clearly illustrating a portion of FIG. 2.

In this embodiment, it is noted that a pair of cylindrical pin boot protectors 25, 25 are respectively arranged in surrounaling relationship with the elastic pin boots 24, 24 to contain the same therein and each head 22a of bolts 22. The cylindrical protectors 25, 25 each are made of elastic synthetic resin and integrally formed with a cylindrical portion 25a for enclosing the pin boot 24, an annular mounting portion 25b for engagement with the flat washer 20, and a closed end portion 25c for enclosing the head 22a of bolt 22. In the actual practice of the present invention, the cylindrical protector 25 may be made of hard synthetic resin if necessary. As can be well seen in FIG. 3, the annular mounting portion 25b of cylindrical protector 25 is formed in its inner peripheral wall with an annular groove $25b_1$, a first tapered annular surface $25b_2$ and a second tapered annular surface $25b_3$. Thus, the cylindrical protector 25 is fixed in place by engagement with the flat washer 20 at its annular groove $25b_1$. The first tapered annular surface $25b_2$ is effective to facilitate assembly of the protector 25, while the second tapered annular surface $25b_3$ is effective to facilitate disassembly of the protector 25. The closed end portion 25c of protector 25 is formed at the outer periphery thereof with an annular projection $25c_1$ to be pulled out by an individual's finger or a tool for removal of the protector 25.

As is understood from the above description, the cylindrical pin boot protector 25 can be manufactured at a low cost because it is made of elastic or hard synthetic resin. During the mounting process of the disc brake assembly, the cylindrical pin boot protectors 25, 25 each are coupled over the head 22a of bolt 22 and pushed toward the caliper member 15 after the support pins 16, 17 have been fixed to the stationary support member 11 by fastening bolts 22, 22. Thus, the pin boot protectors 25, 25 each are easily fixed in place by engagement with the flat washer 20 at its annular groove $25b_1$. Owing to such effective use of the washers 20, 20, the present invention can be practiced at a low cost. When the fixed pin boot protector 25 is pulled out by an individual's finger or a tool at its annular projection $25c_1$, it is easily removed from the flat washer 20. This serves to facilitate the assembly and disassembly of pin boot protectors 25, 25 and to reduce the time required for such operation. Furthermore, the pin boot protector 25 contains therein the pin boot 24 together with the head of bolt 22 and its associated washers 20, 21 to prevent adherence of water and mud thereto. This serves to prevent damage of the pin boot 24 and to protect the bolt and washers from corrosion thereof.

Figure 4:
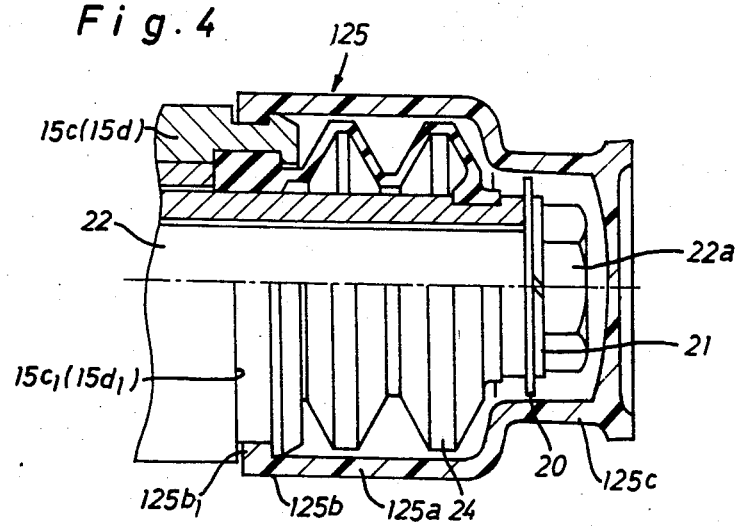
FIG. 4 is a partly enlarged sectional view of another embodiment of the present invention.

In the actual practice of the present invention, the cylindrical pin boot protector 25 may be replaced with a cylindrical protector 125 as shown in FIG. 4. The cylindrical protector 125 is made of elastic synthetic resin and is integrally formed with a cylindrical portion 125a for enclosing the pin boot 24, an annular mounting portion 125b to be coupled over the caliper arm boss 15c, and a closed end portion 125c for enclosing the head 22a of bolt 22. The annular mounting portion 125b of protector 125 is formed at its inner periphery with an annular projection $125b_1$ which is fixedly coupled with an annular groove $15c_1$ of the caliper arm boss 15c to fix the protector 125 in place. Thus, the pin boot protector 125 contains therein the pin boot 24 together with the head 22a of bolt 22 and its associated washers 20, 21 for protection of the same. Even when the caliper member 15 displaced axially inwardly due to defacement of the friction pads 12b, 13b, the pin boot protector 25 can be deformed by engagement with the adjacent member to avoid damage thereof.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A disc brake assembly of the pin slide type for a wheeled vehicle including a stationary support member mounted on a body structure of the vehicle and having at least one support pin fixed thereto, a caliper member having a boss portion slidably supported on said support pin to be movable in an axial direction, said caliper member straddling a portion of a rotary brake disc secured for rotation with a road wheel of the vehicle and having a fluid actuator on one side thereof to press the friction pad of a first brake shoe against one face of said brake disc and a reaction portion on the opposite side thereof to press the friction pad of a second brake shoe against the other face of said brake disc by a reaction force caused by actuation of said fluid actuator, and a tubular elastic boot arranged in surrounding relationship with the outer end portion of said support pin to enclose a sliding portion on the same, wherein a cylindrical protector with a closed end is arranged in surrounding relationship with said tubular elastic boot and is detachably fixed in place by engagement at its internal wall with the outer end portion of said support pin in such a way as to contain therein said tubular elastic boot and the outer end of said support pin.

2. A disc brake assembly as recited in claim 1, wherein said cylindrical protector is integrally formed with a cylindrical portion arranged in surrounding relationship with the boss portion of said caliper member to contain therein said tubular elastic boot, an annular mounting portion detachably engaged at its internal wall with an annular member secured to the outer end portion of said support pin, and a closed end portion arranged to contain therein the outer end of said support pin.

3. A disc brake assembly as recited in claim 2, wherein said cylindrical protector is made of elastic synthetic resin.

4. A disc brake assembly as recited in claim 2, wherein said cylindrical protector is made of hard synthetic resin.

5. A disc brake assembly as recited in claim 1, wherein said support pin is in the form of a hollow pin fixed to said stationary support member by means of a fastening bolt inserted therein through a washer and threaded into said stationary support member, and wherein said cylindrical protector is integrally formed with a cylindrical portion arranged in surrounding relationship with the boss portion of said caliper member to contain therein said tubular elastic boot, an annular mounting portion detachably coupled with said washer, and a closed end portion arranged to contain therein the outer end of said bolt and said washer.

6. A disc brake assembly of the pin slide type for a wheeled vehicle including a stationary support member mounted on a body structure of the vehicle and having at least one support pin fixed thereto, a caliper member having a boss portion slidably supported on said support pin to be movable in an axial direction, said caliper member straddling a portion of a rotary brake disc secured for rotation with a road wheel of the vehicle and having a fluid actuator on one side thereof to press the friction pad of a first brake shoe against one face of said brake disc and a reaction portion on the opposite side thereof to press the friction pad of a second brake shoe against the other face of said brake disc by reaction force caused by actuation of said fluid actuator, a tubular elastic boot arranged in surrounding relationship with the outer end portion of said support pin to enclose a sliding portion on the same, and a cylindrical protector with a closed end arranged in surrounding relationship with said tubular elastic boot and detachably coupled over the boss portion of said caliper member in such a way as to contain therein said tubular elastic boot and the outer end of said support pin wherein said cylindrical protector is integrally formed with an annular mounting portion detachably coupled over the boss portion of said caliper member, a cylindrical portion arranged to contain therein said tubular elastic boot, and a closed end portion arranged to contain therein the outer end of said support pin and the associated members thereof.

7. A disc brake assembly as recited in claim 6, wherein said support pin is in the form of a hollow pin fixed to said stationary support member by means of a fastening bolt inserted therein through a washer and threaded into said stationary support member, and wherein said cylindrical protector is integrally formed with an annular mounting portion detachably coupled over the boss portion of said caliper member, a cylindrical portion arranged to contain therein said tubular elastic boot, and a closed end portion arranged to contain therein the outer end of said bolt and said washer.

8. A disc brake assembly as recited in claim 6, wherein said cylindrical protector is made of elastic synthetic resin.

* * * * *